M. P. CARPENTER.
TRACTOR.
APPLICATION FILED OCT. 25, 1915.
1,245,566.
Patented Nov. 6, 1917
5 SHEETS—SHEET 3.
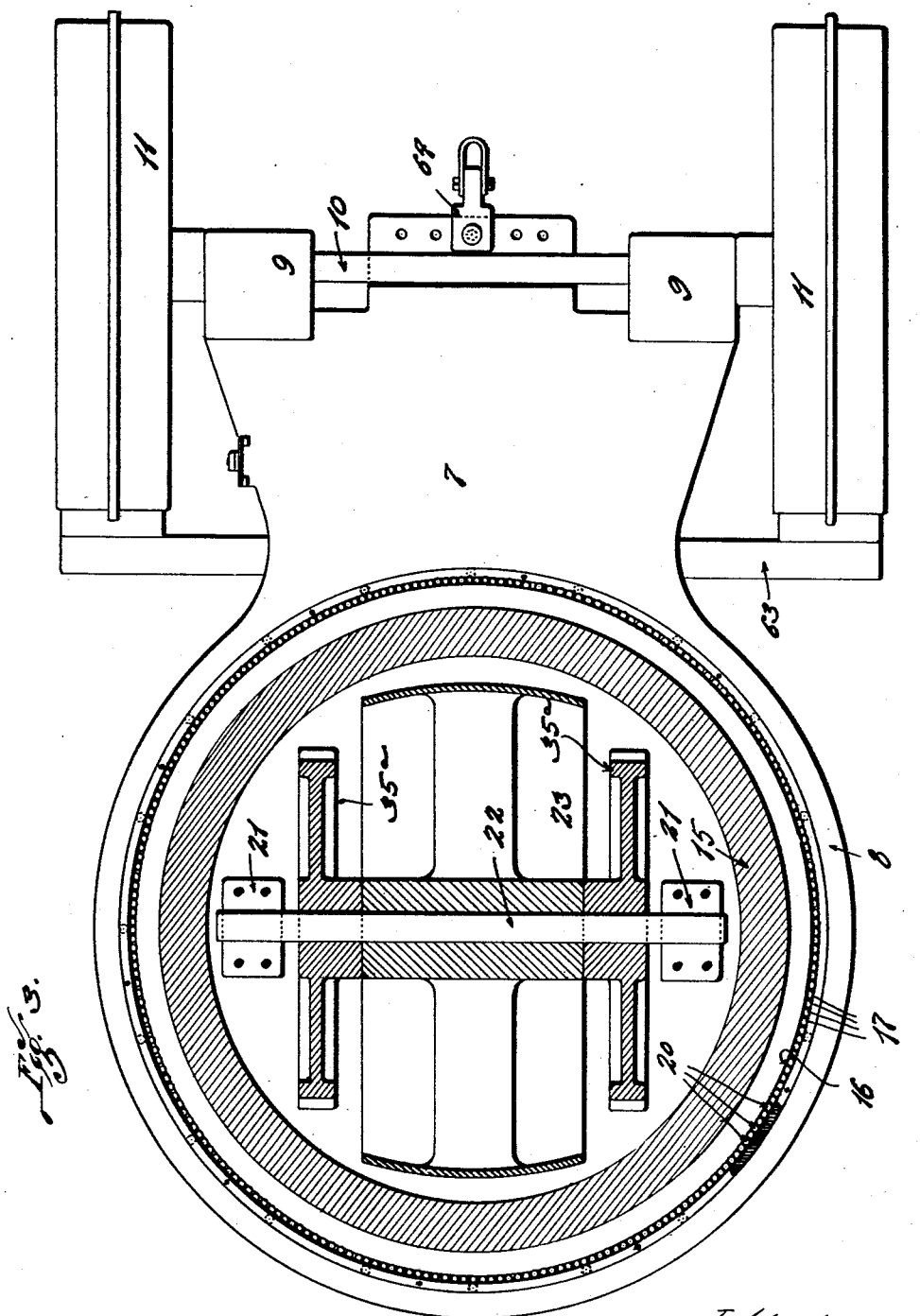

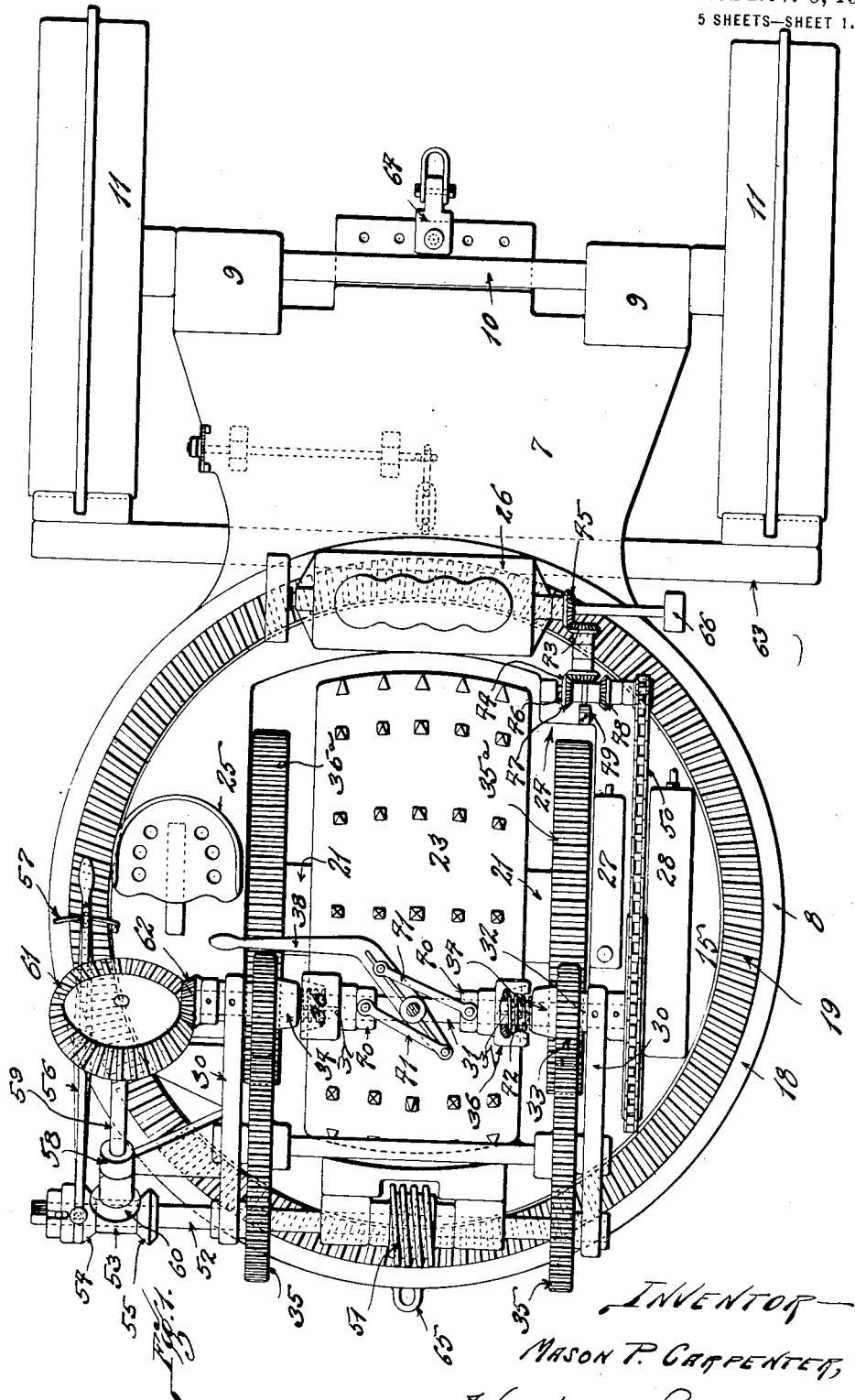

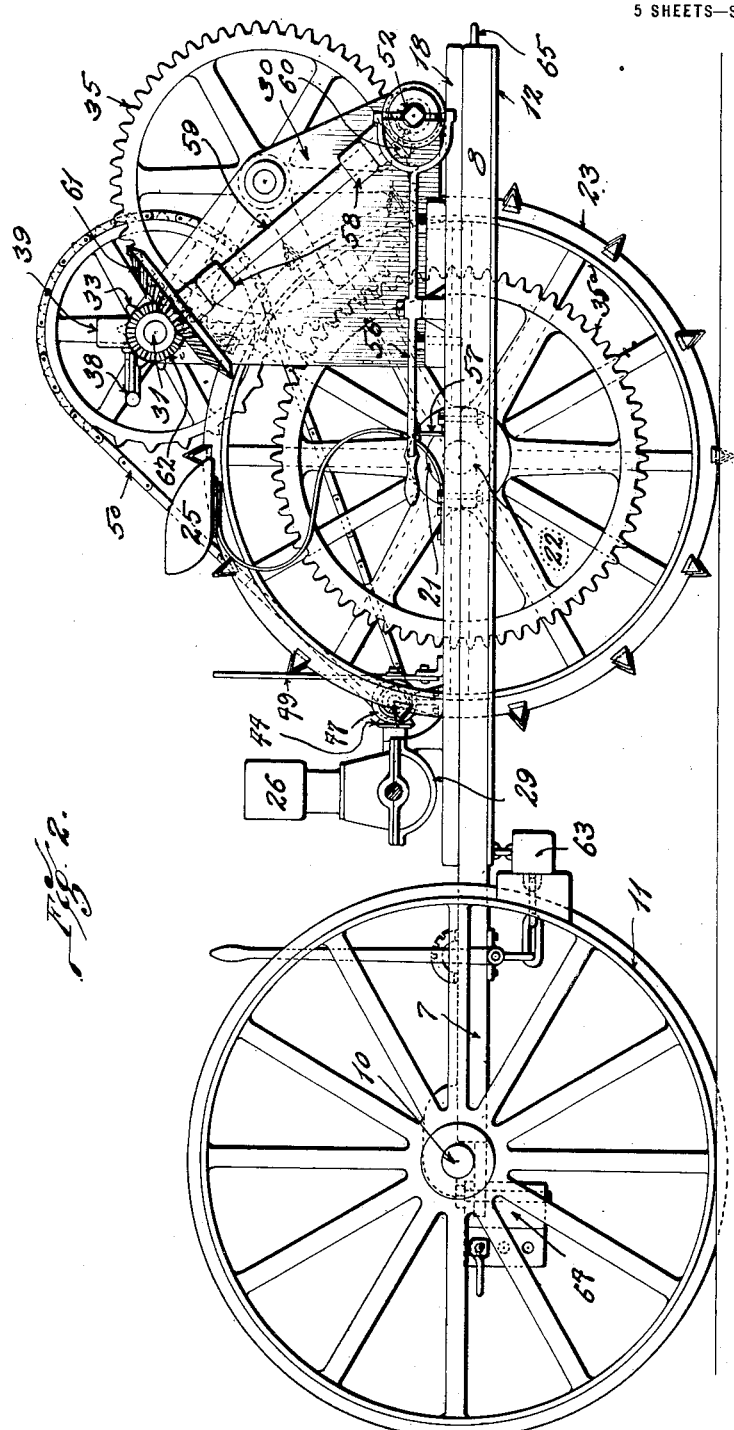

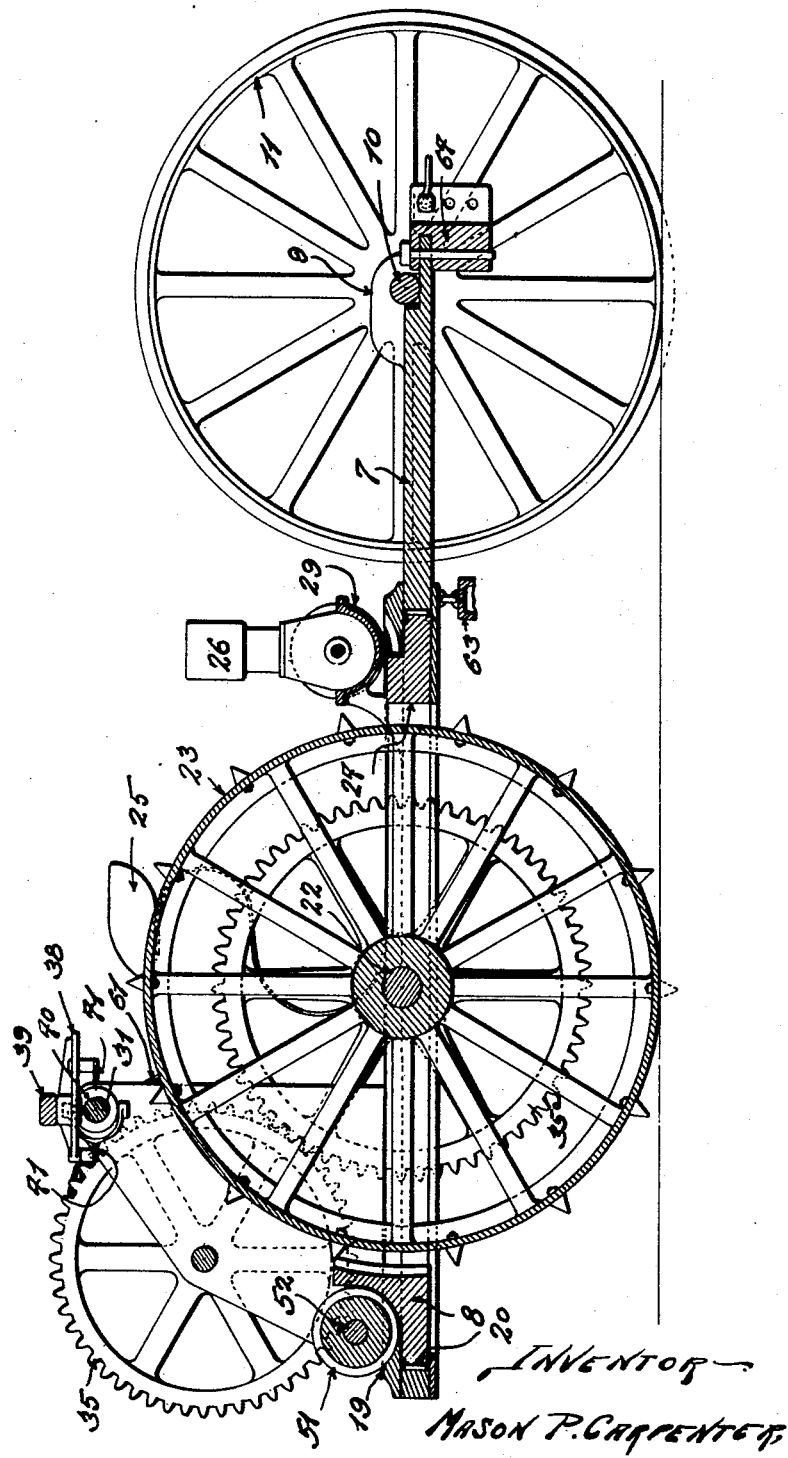

M. P. CARPENTER.
TRACTOR.
APPLICATION FILED OCT. 25, 1915.
1,245,566.
Patented Nov. 6, 1917.
5 SHEETS—SHEET 5.
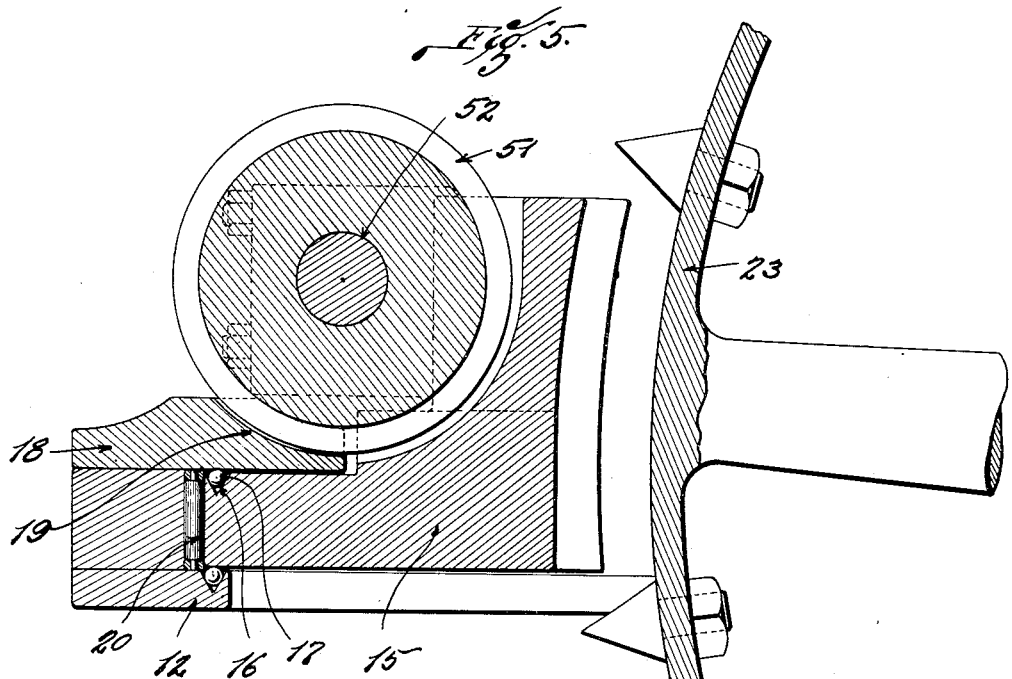
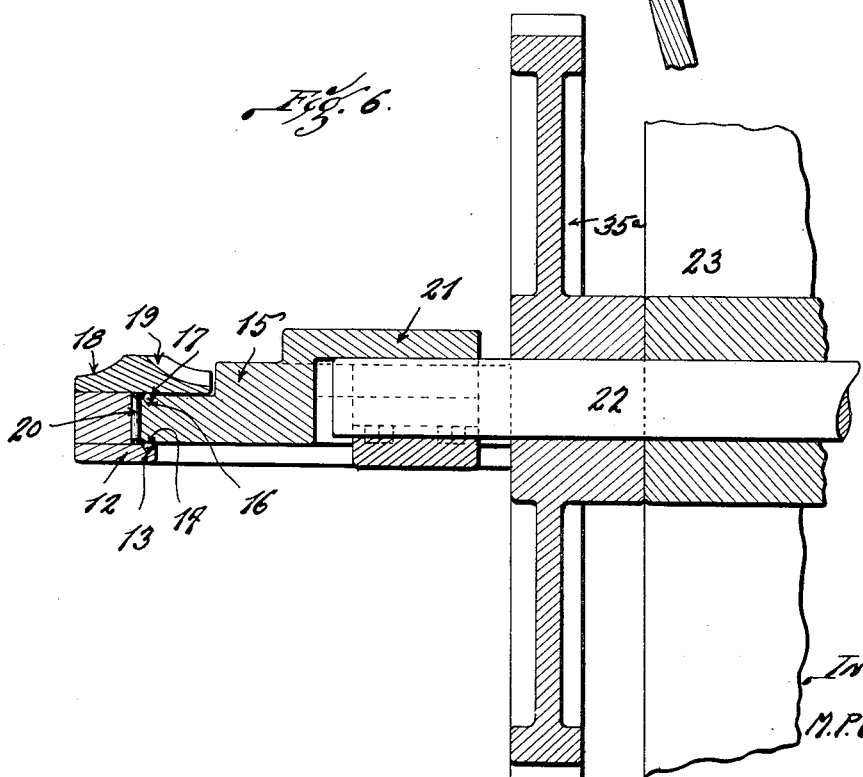
INVENTOR
M. P. CARPENTER
BY Higdon & Longan ATTYS.

UNITED STATES PATENT OFFICE.

MASON P. CARPENTER, OF ST. LOUIS, MISSOURI.

TRACTOR.

1,245,566.  Specification of Letters Patent.  Patented Nov. 6, 1917.

Application filed October 25, 1915. Serial No. 57,757.

*To all whom it may concern:*

Be it known that I, MASON P. CARPENTER, a citizen of the United States, and resident of St. Louis, Missouri, have invented certain new and useful Improvements in Tractors, of which the following is a specification containing a full, clear, and exact description, reference being had to the accompanying drawings, forming a part hereof.

My invention relates to improvements in tractors wherein a combined driving and steering truck is mounted for complete rotation with relation to the running gear or chassis of the tractor and wherein the motor and all gears relating to the motor and the steering and driving truck are carried by the said truck.

My object is to provide a tractor of simple and durable construction, which is easily controlled both as to driving and steering and one which may be turned in a minimum of space.

With this object in view my invention consists in certain novel details of construction and arrangement of parts as hereinafter fully set forth, pointed out in my claims, and illustrated by the accompanying drawings, in which:

Figure 1 is a plan of a tractor embodying my improvements;

Fig. 2 is an elevation of the tractor;

Fig. 3 is a plan of the tractor showing the driving and steering truck in section;

Fig. 4 is a longitudinal sectional elevation taken on a median line;

Fig. 5 is an enlarged detail sectional elevation, showing the mounting and the gear drive for the steering truck, and Fig. 6 is an enlarged detail sectional elevation showing a portion of the combined driving and steering wheel and its mounting on the steering truck frame.

Referring by numerals to the accompanying drawings, 7 designates the main frame, running gear or chassis of the tractor, which is shown as a unitary structure, preferably formed by casting and comprising a ring like body or annulus 8 and bearings 9 for the axle 10 for the wheels 11 of the rear truck.

Secured to the underneath face of the ring like body 8 concentric therewith and projecting inwardly therebeyond, is a bearing ring 12 having a circular race 13 in which is placed the balls 14.

Mounted for rotation, relative to the ring like body 8, upon the balls 14 is a circular table 15, which has formed in its uppermost face a race 16 in which I place the balls 17, over which and secured to the ring like body 8 is a retaining ring 18, having on its uppermost face next its inner perimeter a circular rack 19.

Between the ring like body 8 and the table 15 I interpose the rollers 20, which provide antifriction thrust bearings and coöperate with the supporting bearings comprising the balls 14 and 17 to permit the rotation of the table with a minimum of resistance.

At diametrically opposite points, the table 15 is provided with integral bearings 21 in which is journaled the axle 22 for the driving and steering wheel 23, which wheel 23 is non-rotatively secured to the axle 22 and which wheel projects both above and below the table 15 through an opening 24 provided therefor.

This opening 24 is preferably of oblong shape and parallels, normally, a longitudinal median line of the tractor and on the table around the opening I mount the operator's seat 25, the motor 26, the gasolene tank 27, the radiator 28 and the transmission.

By preference the motor 26 is a gasolene engine of the marine type as shown and is supported on a bed 29 arising from the table 15 and overhanging the circular rack 19, at a point to the rear of the opening 24.

Arising from the table on either side of the opening 24 and in advance of the axle 22 are the frames 30 which carry the transmission and steering gear elements which move with the table.

The transmission gear comprises a shaft 31 mounted for rotation in the frames 30 on which is loosely mounted a pair of sleeves 32 each of which carries a pinion 33 and a cone clutch member 34. The pinions 33 are held in mesh with the gear wheels 35 carried by the frames 30 which in turn mesh with the gear wheels 35ª, secured to the front axle 22. Carried on the shaft 31, are the cone clutch members 36, secured to rotate with the shaft by means of the keys 37, which permit axial movements of the cone members 36.

For the movement of the cone members 36 relative to the cone members 34. I provide a lever 38, pivotally carried on a bar 39 secured over the tops of the frames 30, and arrange a sleeve 40 at each side of the pivotal point of said lever to engage the cone clutch members 36. Each of the sleeves 40 is connected with the lever 38 by means of a link 41 whereby when the lever is moved in a direction to connect the clutch elements 36 with the elements 34 the links move the sleeves and slide the clutch elements 36 over their keys to engagement with the clutch elements 34. To release the clutch elements 36 from the elements 34 the lever is manipulated to free the sleeves 40 to permit the springs 42 to move the clutch members 36 away from the clutch members 34.

Mounted in bearings on the table, near the engine is a shaft, bearing the oppositely arranged miter gear wheels 43 and 44, the wheel 43 arranged in mesh with a wheel 45 on the shaft of the engine 26. At right angles to the shaft bearing the wheels 43 and 44 is a shaft 46 on which is slidably mounted a sleeve bearing at its ends the oppositely disposed miter gear wheels 47 and 48. For moving the sleeve to bring one of its miter gear wheels to mesh with the gear wheel 44 and hold the companion gear wheel free from the gear wheel 44 as required to reverse the motion of the shaft 46, I arrange a lever 49.

The shaft 46 is connected with the shaft 31 of the transmission by means of a sprocket 50.

The steering mechanism comprises the circular rack 19 connected with the table of the steering truck and a worm 51 carried on a shaft 52 mounted in the frames 30, and on which shaft 52 there is a sleeve 53 carrying the oppositely disposed cones 54 and 55. For moving the sleeve and the cones axially of the shaft 52 I provide a lever 56 which is pivotally carried by the rotating table and in order to hold the lever in different set positions, I provide a segmental rack 57.

Extending laterally from the one frame 30 are the bearings 58 for the support of a shaft 59 carrying at its lowermost end a cone for engagement with one or the other of the cones 54 and 55 and on the upper end of the shaft 59, there is a miter gear wheel in mesh with a miter gear wheel 62 carried on the driven transmission shaft 31.

The tractor is equipped with a brake mechanism 63, coupler devices 64 and 65 at the ends of the frame or chassis, and a pulley 66 on the shaft of the engine 26.

By means of the mechanism comprising the miter gear wheels 44, 47 and 48 it is obvious that the tractor as a whole may be driven either forwardly or in a reverse direction, and that by means of the cone pulleys 60, 54 and 55, the worm 51 and circular rack 19, the motor may be utilized in the steering of the tractor.

It is apparent also by reason of the steering truck being capable of a complete rotation relative to the frame of the truck, that the widest possible range of steering is obtained, regardless of the direction of travel in either a forward or reverse motion.

Having thus described my invention what I claim as new therein, and desire to secure by Letters Patent of the United States therefor is:

1. A tractor comprising a frame, a steering truck capable of complete rotation relative to said frame, a motor and a reversible gear connection between said motor and said steering truck, whereby the motor may rotate the steering truck in either direction with relation to the frame.

2. In a tractor a frame, a wheeled truck mounted for complete rotation relative to the frame of the tractor, a motor carried by said wheeled truck for the propelling thereof, and a gear connecting said motor and truck for the steering of said truck.

3. In a tractor, the combination with a running gear of a table mounted for complete rotation relative to the said running gear, a single steering and driving wheel movable with said table, a motor, a reversible gear connecting said motor with said steering and driving wheel for the propelling of the tractor, and a reversible gear connecting said motor with said table for the steering of the tractor, whereby the motor may be made to impart to the table carrying the steering wheel a complete rotation relative to the running gear.

4. In a tractor the combination with a frame having a wheeled support, a single wheeled truck mounted for complete rotation relative to said frame, a motor carried by said truck, a transmission gear carried by said truck to connect the motor with the driving wheel of said truck and a gear connecting said motor with said truck to rotate said truck relative to said frame.

5. In a tractor a frame comprising an annulus, a table mounted for complete rotation in said annulus, a circular rack secured to said table, a gear supported by the annulus and meshing with said rack, a single combined steering and driving wheel bodily movable with the table, a motor carried by the table, a gear connecting the motor with the steering and driving wheel, means for connecting and disconnecting the motor with the gear meshing with said rack, means for connecting and disconnecting the motor with the gears for driving the combined steering and driving wheel and a reverse gear between the motor and the other mentioned gears.

In testimony whereof, I have signed my name to this specification, in presence of two subscribing witnesses.

MASON P. CARPENTER.

Witnesses:
  JAS. F. CARPENTER,
  R. G. ORWIG.

Copies of this patent may be obtained for five cents each, by addressing the "Commissioner of Patents, Washington, D. C."